US009787214B2

(12) United States Patent
Sugahara

(10) Patent No.: US 9,787,214 B2
(45) Date of Patent: Oct. 10, 2017

(54) POWER CONVERSION DEVICE WITH OVERVOLTAGE SUPPRESSION

(71) Applicant: Mitsubishi Electric Corporation, Chiyoda-ku, Tokyo (JP)

(72) Inventor: Tetsuo Sugahara, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 0 days.

(21) Appl. No.: 15/108,092

(22) PCT Filed: Dec. 27, 2013

(86) PCT No.: PCT/JP2013/085132
§ 371 (c)(1),
(2) Date: Jun. 24, 2016

(87) PCT Pub. No.: WO2015/097868
PCT Pub. Date: Jul. 2, 2015

(65) Prior Publication Data
US 2016/0329824 A1    Nov. 10, 2016

(51) Int. Cl.
*H02M 5/458*    (2006.01)
*H02M 3/20*    (2006.01)
(Continued)

(52) U.S. Cl.
CPC ........... *H02M 5/458* (2013.01); *H02H 3/023* (2013.01); *H02H 3/048* (2013.01); *H02H 3/05* (2013.01);
(Continued)

(58) Field of Classification Search
CPC ........ H02M 5/458; H02M 1/08; H02H 3/048; H02H 3/20
See application file for complete search history.

(56) References Cited

U.S. PATENT DOCUMENTS 5,113,126 A * 5/1992 Nanzan .................. B60L 9/005
318/809
7,480,160 B2 * 1/2009 Bakran ............... H02M 5/4585
363/35
(Continued)

FOREIGN PATENT DOCUMENTS

JP      7-31001 A     1/1995
JP     7-154974 A     6/1995
(Continued)

OTHER PUBLICATIONS

International Search Report (PCT/ISA/210) issued on Feb. 10, 2014, by the Japanese Patent Office as the International Searching Authority for International Application No. PCT/JP2013/085132.
(Continued)

*Primary Examiner* — Emily P Pham
(74) *Attorney, Agent, or Firm* — Buchanan Ingersoll & Rooney PC

(57) ABSTRACT

Even when an overvoltage suppression circuit is not formed due to failure of an overvoltage suppression switch, overvoltage application to semiconductors and a filter capacitor is prevented. A control unit controls the overvoltage suppression circuit to short-circuit the filter capacitor when the voltage thereacross exceeds a predetermined value. Then when non-operation of the overvoltage suppression circuit is detected, the control unit opens an AC breaker and AC switch, and closes a charging switch. Thereafter, the control unit turns ON the converter element (or converter element) connecting to the filter capacitor terminal (or terminal) and a charging resistor, and turns ON converter element (or converter element) connecting to terminal (or terminal) of filter capacitor and connecting to the terminal of the transformer not connected to charging resistor.

3 Claims, 5 Drawing Sheets

(51) Int. Cl.
  *H02M 3/04*   (2006.01)
  *H02P 27/06*  (2006.01)
  *H02H 3/02*   (2006.01)
  *H02H 7/12*   (2006.01)
  *H02M 1/32*   (2007.01)
  *H02H 3/04*   (2006.01)
  *H02H 3/05*   (2006.01)
  *H02H 3/20*   (2006.01)
  *H02H 7/09*   (2006.01)
  *H02M 1/08*   (2006.01)
  *H02M 1/00*   (2006.01)

(52) U.S. Cl.
  CPC ............... *H02H 3/20* (2013.01); *H02H 7/09* (2013.01); *H02H 7/1216* (2013.01); *H02M 1/08* (2013.01); *H02M 1/32* (2013.01); *H02M 5/4585* (2013.01); *H02P 27/06* (2013.01); *H02M 2001/0009* (2013.01); *H02M 2001/322* (2013.01)

(56) References Cited

U.S. PATENT DOCUMENTS

2013/0003429 A1\* 1/2013 Murahashi ............ B60L 3/0046
                                                363/56.01
2014/0312810 A1    10/2014 Toda et al.

FOREIGN PATENT DOCUMENTS

| JP | 8-331870 A | 12/1996 |
| JP | 11-98610 A | 4/1999 |
| JP | 2013-158232 A | 8/2013 |
| JP | 2013-230020 A | 11/2013 |
| WO | WO 2007/129469 A1 | 11/2007 |
| WO | WO 2011/104848 A1 | 9/2011 |

OTHER PUBLICATIONS

Written Opinion (PCT/ISA/237) issued on Feb. 10, 2014, by the Japanese Patent Office as the International Searching Authority for International Application No. PCT/JP2013/085132.

\* cited by examiner

POWER CONVERSION DEVICE WITH OVERVOLTAGE SUPPRESSION

TECHNICAL FIELD

The present disclosure relates to a power conversion device including a converter and an inverter, and particularly relates to overvoltage suppression of the power conversion device.

BACKGROUND ART

An AC electric vehicle equipped with a converter and an inverter uses the converter to convert high voltage AC electric power from an AC power supply into DC electric power, uses the inverter for conversion into variable voltage and variable frequency 3-phase AC electric power, and drives the electric motor. In order to maintain a stable output DC voltage of the converter, the DC current side of the converter is connected to a filter capacitor in parallel with the load (inverter). The converter and inverter can perform regenerative braking. During regenerative braking, in a manner opposite to the aforementioned operation, AC electric power generated by the electric motor is returned from a pantograph to the AC power supply.

However, the regenerative load as seen by the electric vehicle during regenerative braking may be reduced suddenly due to pantograph-overhead line disconnection, rapid change of load of another electric vehicle connected to the overhead line and the like, and voltage across the filter capacitor may become higher than normal. When voltage across the capacitor becomes high, an abnormal voltage is applied to the semiconductor elements of the converter and inverter, and to the filter capacitor. Application of abnormal voltage damages these components, and thus to avoid such damage, an overvoltage suppression circuit is arranged to form a short circuit across the filter capacitor through a resistance.

That is to say, when voltage across the filter capacitor is detected to have become higher than a predetermined value, the gates of the inverter and converter elements are turned OFF, and the regenerative braking operation stops. Then the overvoltage suppression switch closes so that the filter capacitor is shorted through the overvoltage suppression resistor, the regeneration electric power output by the inverter is released, and thus voltage of the filter capacitor is lowered. If this condition continues unchecked, current continues to flow in the overvoltage suppression resistor from the AC power supply side through the diodes of the converter. Thus the converter input-side AC switch is opened simultaneous with the closing of the overvoltage suppression switch.

Patent Literature 1 describes a power conversion device mounted in an AC electric vehicle, in which the power conversion device avoids overheating damage of the overvoltage suppression resistor, even when the normal release operation does not occur, for example, due to failure of the AC switch and the like. According to the power conversion device of Patent Literature 1, a current detector is provided that detects current in the overvoltage suppression resistor, and if the AC switch does not open normally, an AC circuit breaker is opened according to the condition of output from the current detector, and current from the AC power supply side to the overvoltage suppression resistor is cut off.

Patent Literature 2 mentions charging and discharging of a filter capacitor, improvement of utilization rate of initial charge resistance and a switch for initial charging, and preparation for the occurrence of erroneous simultaneous closing of the switch for initial charging and a switch for discharging. A discharge circuit of a main circuit capacitor of the Patent Literature 2 is equipped with a discharging switch in a regeneration function-equipped sine wave converter which supplies electric power of an AC power supply through an AC reactor and a closed circuit to an initial charging circuit, a three-phase bridge circuit and a main capacitor that are inserted in the circuit. By closing the discharging switch, a circuit is formed for using the initial charge resistance forming the initial charging circuit as a discharging resistance.

In addition, Patent Literature 3 describes closing a contact for charging, and firing a self-arc extinguishing element of a converter to discharge a filter capacitor (FIG. of Patent Literature 3). Moreover, Patent Literature 4 describes current flowing through a circuit that includes a converter element, an initial charging contact and a charging resistance thereof, to cause discharge of a capacitor (FIG. 5 of Patent Literature 4).

CITATION LIST

Patent Literature

Patent Literature 1: Unexamined Japanese Patent Application Kokai Publication No. H07-154974
Patent Literature 2: Unexamined Japanese Patent Application Kokai Publication No. H08-331870
Patent Literature 3: Unexamined Japanese Patent Application Kokai Publication No. H11-098610
Patent Literature 4: International Publication No. WO2007/129469

SUMMARY OF INVENTION

Technical Problem

According to the overvoltage suppression circuit of Patent Literature 1, if the overvoltage suppression circuit is not formed, for example, failure of the overvoltage suppression switch causes application of abnormal voltage for a long period to the semiconductor elements of the converter and inverter, and to the filter capacitor. Such abnormal voltage may cause failure of the semiconductor elements or filter capacitor. The same problem occurs if the switch for discharging fails in the discharge circuit of Patent Literature 2.

In consideration of the above circumstances, the object of the present disclosure is to prevent application of overvoltage to the semiconductor elements and filter capacitor, even when an overvoltage suppression circuit is not formed due to failure of the overvoltage suppression switch.

Solution to Problem

To achieve the objective, the power conversion device of the present disclosure includes:
an electric power transmission circuit to receive electric power supplied from an external circuit and to output AC electric power;
a breaker to switch between passing and blocking of a current flow between the electric power transmission circuit and the external circuit;
a converter to convert AC electric power output from the electric power transmission circuit into DC electric power;
a capacitor to connect to the DC side of the converter;

a charging resistor and a first contactor to connect together in series between the electric power transmission circuit and the converter; and a second contactor to bypass the charging resistor and the first contactor, and to switch between passing and blocking of current flow between the electric power transmission circuit and the converter, wherein the power conversion device operates on DC electric power output by the converter and to connect to a load circuit capable of generating regeneration electric power.

Also, the power conversion device further includes:

an overvoltage detector to detect when voltage across the capacitor is greater than or equal to a determined voltage;

an overvoltage suppression circuit to short-circuit the capacitor through a resistor when a voltage across the capacitor exceeds the predetermined value;

a detector to, when the voltage across the capacitor is greater than or equal to the determined voltage, detect that the overvoltage suppression circuit is not operating; and a control unit, when the voltage across the capacitor exceeds the predetermined value and the overvoltage suppression circuit does not operate, to perform steps comprising:

opening the breaker and the second contactor;

closing the first contactor; and turning on a converter element connected to a first terminal of the capacitor and to the charging resistor, and turning on a converter element connected to a second terminal of the capacitor and to a terminal not connected to the charging resistor of the electric power transmission circuit.

Advantageous Effects of Invention

According to the present disclosure, a separate discharge path is formed that uses existing circuit elements and does not pass through an overvoltage control switch, and the application of overvoltage to the semiconductor elements and filter capacitor can be prevented, even when an overvoltage suppression circuit is not formed due to failure of the overvoltage suppression switch.

DESCRIPTION OF EMBODIMENTS

Embodiments of the present disclosure are hereinafter described with reference to figures. Within the figures, components that are the same or equivalent are assigned the same reference sign.

Embodiment 1

Figure 1:
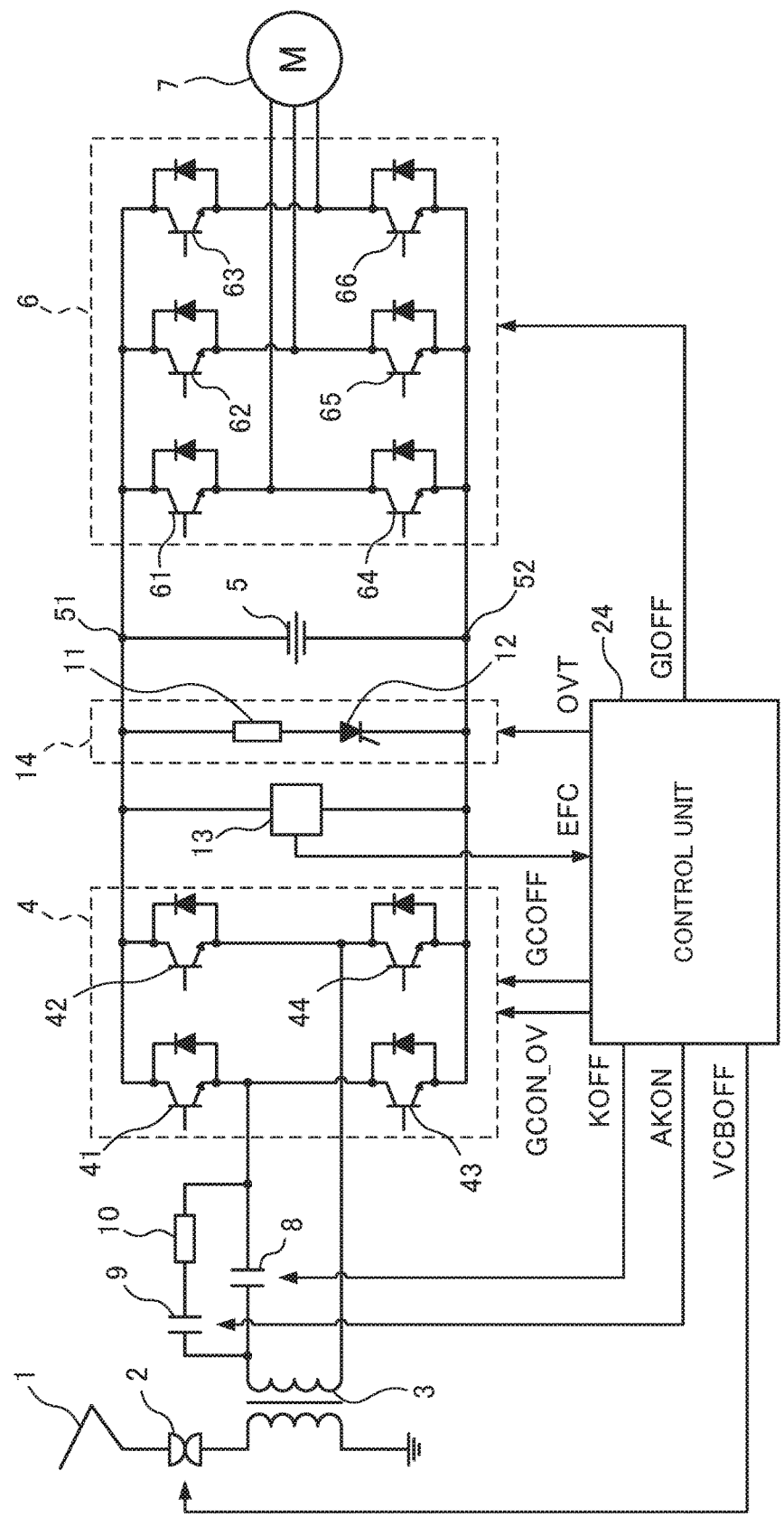
FIG. 1 shows an example configuration of a power conversion device according to Embodiment 1 of the present disclosure.

FIG. 1 shows an example configuration of a power conversion device according to Embodiment 1 of the present disclosure. The power conversion device uses a transformer 3 to transform AC electric power supplied by a pantograph 1, and after conversion to DC electric power by a converter 4, uses an inverter 6 to convert to three-phase AC electric power of variable voltage and variable frequency to drive an electric motor 7. The power conversion device can also perform regeneration. During regeneration operation, AC electric power from the electric motor 7 is converted by the inverter 6 into DC electric power, which is converted to AC electric power by the converter 4 for return through the transformer 3 to the overhead line side from the pantograph 1.

The pantograph 1 sliding against the overhead line (non-illustrated) and connecting to the AC power supply is connected through an AC breaker 2 to a primary winding of the transformer 3. The AC breaker 2 switches between allowing and blocking flow of current between the pantograph 1 and the transformer 3. A charging switch (first contactor) 9 and a charging resistor 10 are connected in series between the transformer 3 and the converter 4. Moreover, an AC switch (second contactor) 8 is connected in parallel to the charging switch 9 and the charging resistor 10. The AC switch 8 bypasses the charging switch 9 and the charging resistor 10, and switches between allowing and blocking of current flow between the transformer 3 and the converter 4.

The converter 4, for example, is configured as a bridge circuit of arm members that include semiconductor elements, for example, such as insulated-gate bipolar transistors (IGBT), flywheel diodes and the like. The filter capacitor 5 and the inverter 6 are connected in parallel to the DC side of the converter 4. The inverter 6 converts the DC electric power to three-phase AC electric power. The electric motor 7 is connected to the three-phase AC side of the inverter 6.

An overvoltage detector 13 and an overvoltage suppression circuit 14 are connected in parallel to the filter capacitor 5. The overvoltage suppression circuit 14 includes an overvoltage suppression resistor 11 and an overvoltage suppression switch 12 connected together in series. The overvoltage suppression switch 12 is a semiconductor element, for example, such as a thyristor, IGBT and the like.

The overvoltage detector 13 detects voltage across the filter capacitor 5. The detection signal EFC of the overvoltage detector 13 is sent to the control unit 24. The control unit 24 controls the AC breaker 2, AC switch 8, charging switch 9, converter 4, overvoltage suppression circuit 14 and inverter 6, runs the electric motor 7, and returns regeneration electric power from the electric motor 7 to the AC power supply side. The power conversion device functions as described below.

The high voltage AC electric power collected from the AC power supply (non-illustrated) using the pantograph 1 is supplied through the AC breaker 2 to the primary winding of the transformer 3. AC electric power lowered to a certain voltage is supplied by a secondary winding of the transformer 3 to the converter 4. During initialization of operation of the power conversion device, the control unit 24 closes the charging switch 9 in a state in which the AC switch 8 is open, and supplies AC electric power to the converter 4 through the charging resistor 10. The converter 4 converts AC electric power to DC electric power. The filter capacitor 5 becomes charged during the initialization. When charging of the filter capacitor 5 is completed, the control unit 24 closes the AC switch 8 and opens the charging switch 9.

Together with converting single-phase AC electric power to DC electric power, the converter 4 operates so as to maintain a constant voltage across the filter capacitor 5. The inverter 6 drives the electric motor 7, that is, the AC load, by converting DC electric power from the filter capacitor 5 into variable voltage and variable frequency three-phase AC electric power.

During regeneration operation, the control unit 24 causes the converter 4 and the inverter 6 to operate in reverse so that AC electric power from the electric motor 7 returns to the overhead line through the transformer 3 and from the pantograph 1. At this time, the AC breaker 2 and the AC switch 8 are in the closed state, and the charging switch 9 is open. Moreover, the overvoltage suppression switch 12 is open so that no current flows in the overvoltage suppression circuit 14.

For example, during regeneration operation in a state in which AC electric power generated from the electric motor 7 is regenerated to the overhead line side through the inverter 6, converter 4 and transformer 3, voltage across the filter capacitor 5 quickly increases when there is a lowering of uptake capacity of regeneration electric power due to line disconnection between the overhead line and the pantograph 1, and the like. The control unit 24 monitors the voltage detected by the overvoltage detector 13, and when this voltage exceeds a predetermined value, halts the regeneration operation and closes the overvoltage suppression switch 12.

Figure 2:
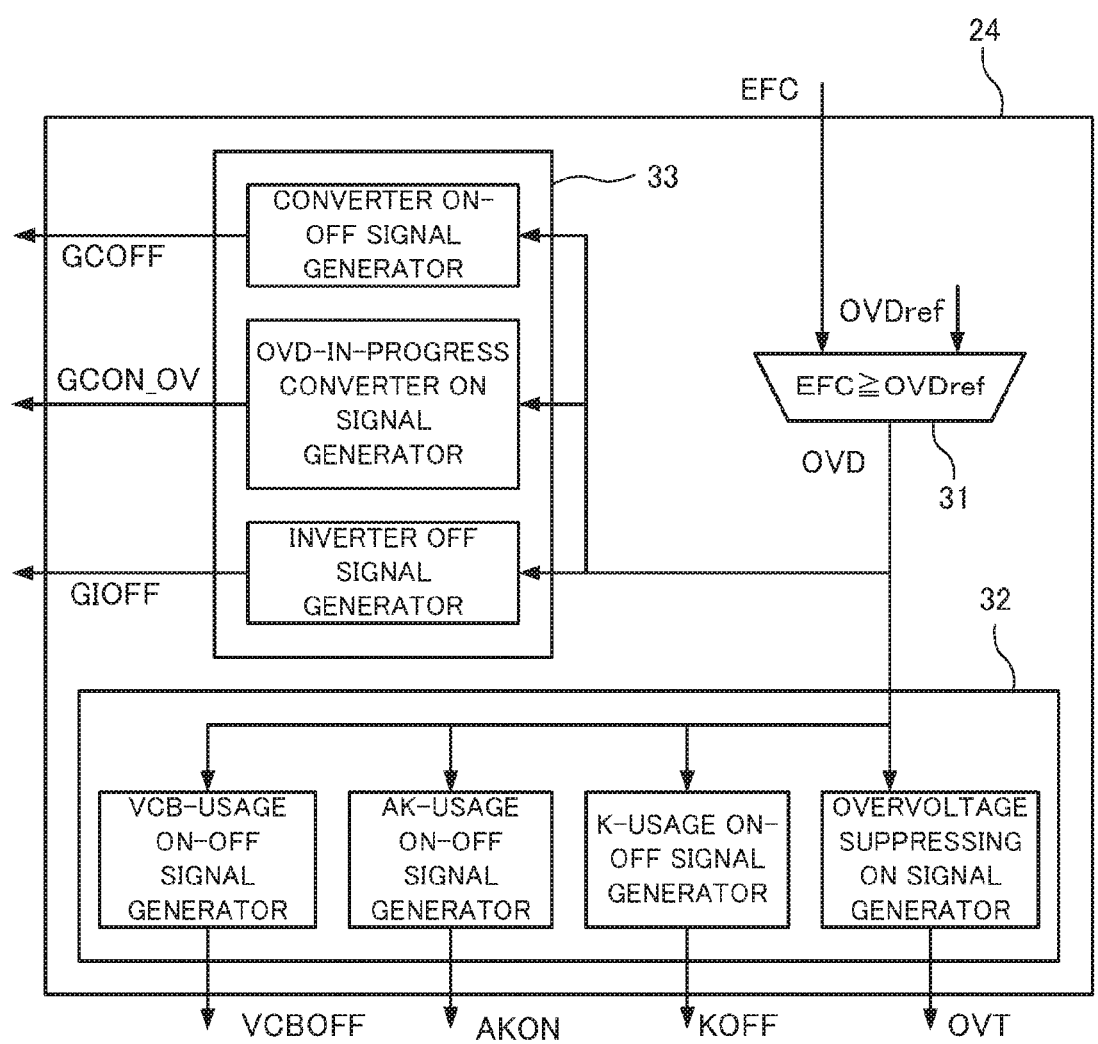
FIG. 2 shows an example configuration of a control unit of the power conversion device according to Embodiment 1.

FIG. 2 shows an example configuration of a control unit of the power conversion device according to Embodiment 1. The control unit 24 includes a voltage determiner 31, a contactor ON-OFF determiner 32 and a semiconductor element ON-OFF determiner 33. When the signal EFC of the overvoltage detector 13 is greater than or equal to a predetermined voltage OVDref, the voltage determiner 31 outputs an overvoltage signal OVD. The overvoltage signal OVD is input to the contactor ON-OFF determiner 32 and the semiconductor element ON-OFF determiner 33.

Upon receiving the overvoltage signal OVD, the contactor ON-OFF determiner 32 generates an overvoltage suppressing ON signal OVT. The overvoltage suppressing ON signal OVT is sent to the overvoltage suppression circuit 14 (FIG. 1) and closes the overvoltage suppression switch 12. Simultaneously, the contactor ON-OFF determiner 32 generates a K-usage-OFF signal KOFF for opening the AC switch 8. The K-usage-OFF signal KOFF opens the AC switch 8 (FIG. 1).

Upon receiving of the overvoltage signal OVD, the semiconductor element ON-OFF determiner 33 generates a converter OFF signal GCOFF. The converter OFF signal GCOFF is sent to the converter 4 (FIG. 1), and turns all converter elements 41 to 44 OFF. Simultaneously, the semiconductor element ON-OFF determiner 33 generates an inverter OFF signal GIOFF. The inverter OFF signal GIOFF is sent to the inverter 6 (FIG. 1), and turns all inverter elements 61 to 66 OFF.

The control unit 24 determines whether the overvoltage suppression circuit 14 is operating during outputting of the overvoltage suppressing ON signal OVT. For example, if the overvoltage signal OVD continues to be output for a fixed period after the start of output of the overvoltage suppressing ON signal OVT, the determination is made that the overvoltage suppression circuit 14 is not operating.

Non-operation of the overvoltage suppression circuit 14 can be determined, for example, by sensing of current flowing through the overvoltage suppression resistor 11. Additionally, a determination can be made that the operation suppression circuit 14 is not operating, for example, when the potential difference across the overvoltage suppression resistor 11 is greater than a predetermined value.

When there is a determination that the overvoltage suppression circuit 14 is not operating, the contactor ON-OFF determiner 32 generates a for-AK-use ON signal AKON for closing the charging switch 9 and a for-VCB-use OFF signal VCBOFF for opening the AC breaker 2. The for-AK-use ON signal AKON is sent to the charging switch 9 (FIG. 1), and closes the charging switch 9. Moreover, the for-VCB-use OFF signal VCBOFF is sent to the AC breaker 2 (FIG. 1), and opens the AC breaker 2.

When determination is made that the overvoltage suppression circuit 14 is not operating, the semiconductor element ON-OFF determiner 33 generates a OVD-in-progress converter ON signal GCON_OV. The OVD-in-progress converter ON signal GCON_OV is sent to the converter 4 (FIG. 1), and turns for example, the converter element 41 and the converter element 44 ON.

Thus the filter capacitor 5 is short-circuited through a route including the terminal 51, converter element 41, charging resistor 10, charging switch 9, transformer 3 secondary winding, converter element 44 and terminal 52, and is discharged through the charging resistor 10. This releases the overvoltage applied to the converter 4, inverter 6 and filter capacitor 5.

The converter element 42 and the converter element 43 may be turned ON by the OVD-in-progress converter ON signal GCON_OV. In this case, the filter capacitor 5 is shorted through a route that includes the terminal 51, converter element 42, transformer 3 secondary winding, charging switch 9, charging resistor 10, converter element 43 and terminal 52.

That is to say, due to the OVD-in-progress converter ON signal GCON_OV, the converter element 41 (or the converter element 43) connected to the terminal 51 (or terminal 52) of the filter capacitor 5 and the charging resistor 10 is turned ON, and the converter element 44 (or the converter element 42) connected to the other terminal 52 (or terminal 51) of the filter capacitor 5 and the terminal of the transformer 3 not connected to the charging resistor 10 is turned ON.

Figure 3:
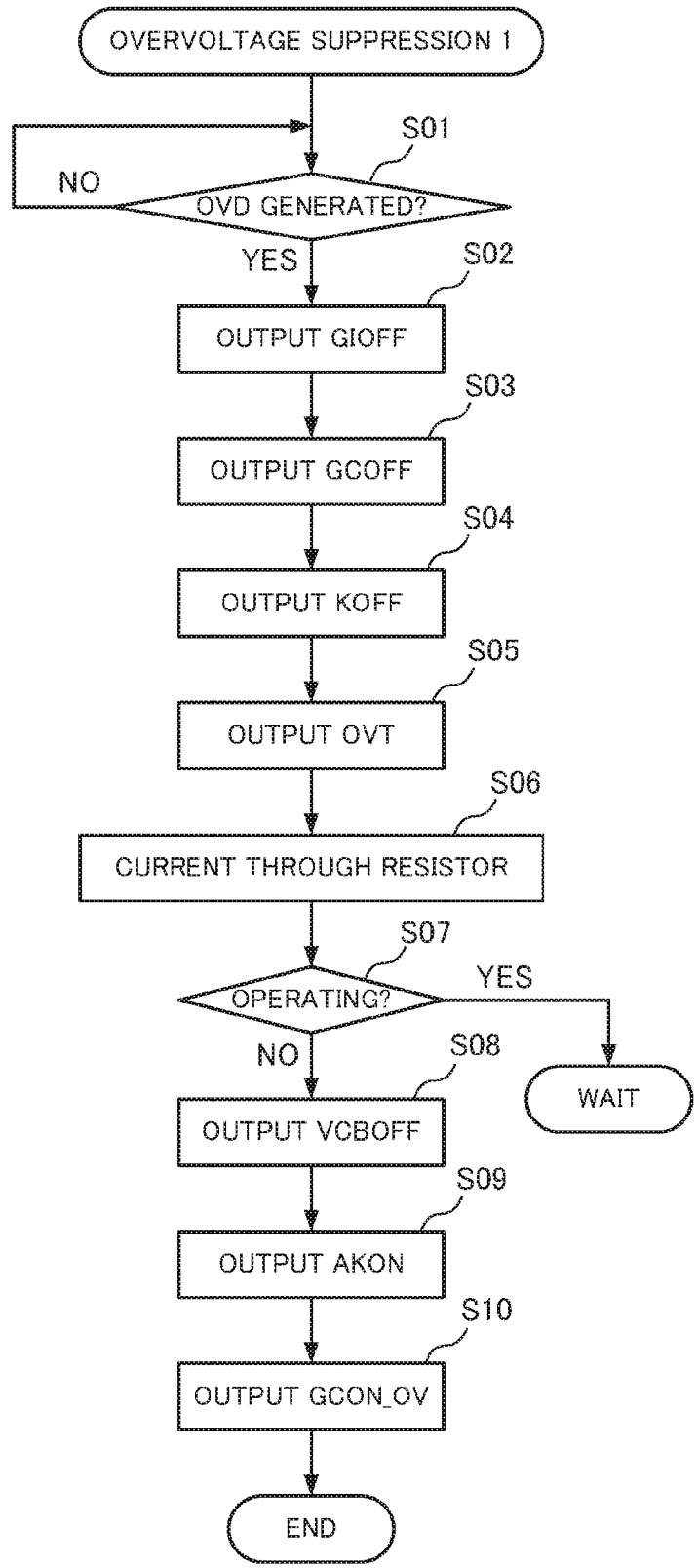
FIG. 3 is a flowchart showing one example of operation of overvoltage suppression according to Embodiment 1.

FIG. 3 is a flowchart showing one example of operation of overvoltage suppression according to Embodiment 1. The control unit 24 waits for generation of the overvoltage signal OVD (NO in step S01). When the overvoltage signal OVD is generated (YES in step S01), the inverter OFF signal GIOFF is output (step S02), and the converter OFF signal GCOFF is output (step S03). Then the K-usage-OFF signal KOFF for opening the AC switch 8 is output (step S04), and the overvoltage suppressing ON signal OVT is output (step S05). Although current is anticipated to flow in the overvoltage suppression resistor 11 (step S06), voltage of the filter capacitor 5 is monitored, and a determination is made as to whether the overvoltage suppression circuit 14 is operating (step S07).

When the overvoltage suppression circuit 14 is determined to be operating (YES in step S07), processing enters a status quo-maintenance state. Thereafter, when voltage of the filter capacitor 5 declines and voltage of the pantograph 1 returns to the overhead line voltage, processing returns to the initial state (not illustrated).

When determination is made that the overvoltage suppression circuit 14 is not operating (NO in step S07), the for-VCB-use OFF signal VCBOFF for opening the AC breaker 2 is output (step S08), and the for-AK-use ON signal AKON for closing the charging switch 9 is output (step S09). Then the OVD-in-progress converter ON signal GCON_OV is output (step S10), and processing ends.

Embodiment 2

Figure 4:
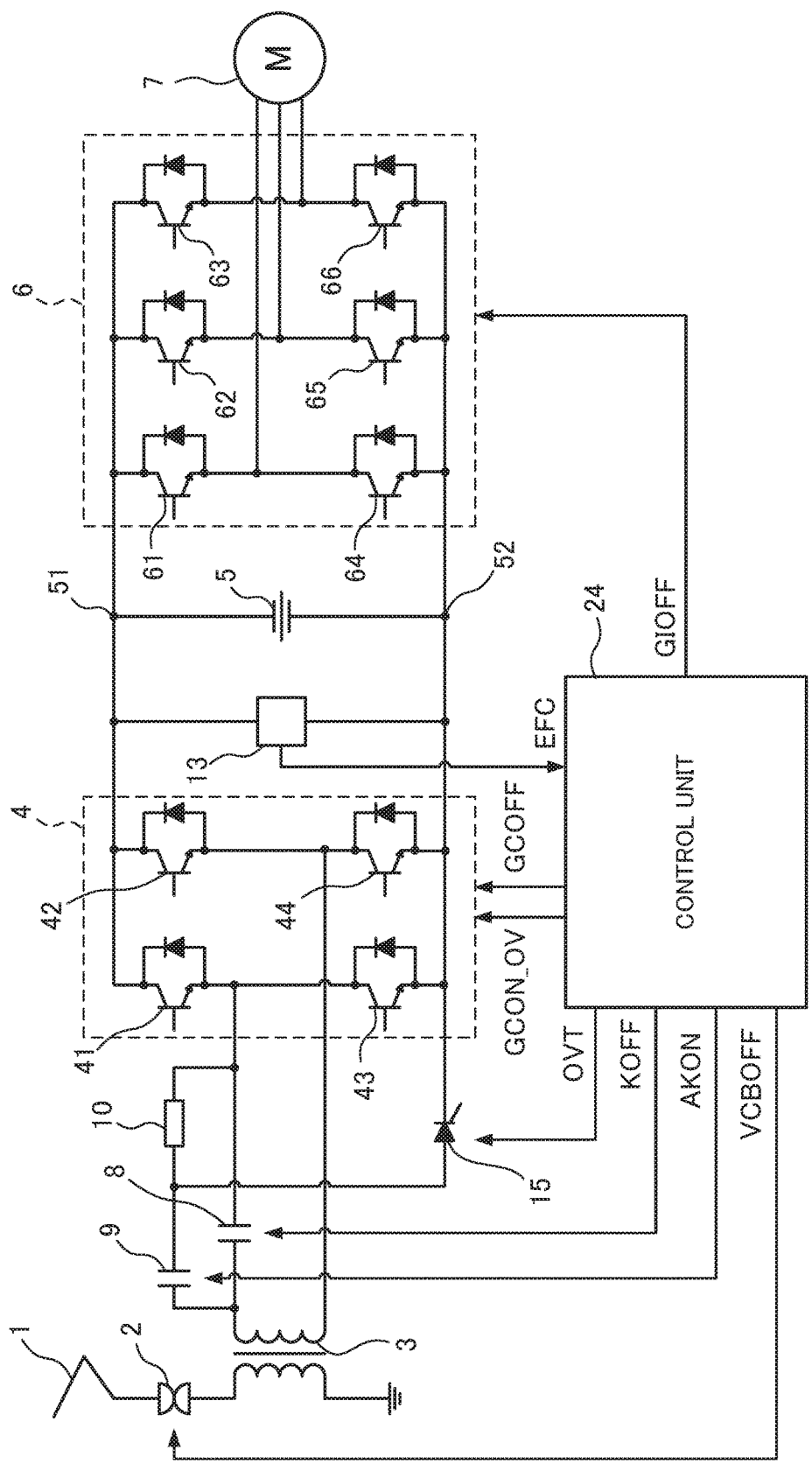
FIG. 4 shows an example configuration of a power conversion device according to Embodiment 2 of the present disclosure.

FIG. 4 shows an example configuration of a power conversion device according to Embodiment 2 of the present disclosure. In Embodiment 2, the charging resistor 10 is used as a resistance for overvoltage suppression. The charging resistor 10 is also used for short-circuiting the filter capacitor 5, in the same manner as in Embodiment 1, when the overvoltage signal OVD is generated and determination is made that the overvoltage suppression circuit is not operating.

Among the components included in Embodiment 1, the overvoltage suppression resistor 11 and the overvoltage suppression switch 12 are omitted from Embodiment 2, which is equipped instead with an overvoltage suppression switch 15. The overvoltage suppression switch 15 connects between the terminal 52 of the filter capacitor 5 and the node connecting together the charging switch 9 and the charging resistor 10. In this configuration, the overvoltage suppression circuit includes the converter element 41, the charging resistor 10 and the overvoltage suppression switch 15.

In the same manner as in Embodiment 1, when a voltage greater than or equal to the certain voltage OVDref is detected by the overvoltage detector 13, the control unit 24 outputs the inverter OFF signal GIOFF, converter OFF signal GCOFF, AC switch OFF signal KOFF and overvoltage suppressing ON signal OVT. However, although the converter elements 42 to 44 are turned OFF by the converter OFF signal GCOFF according to Embodiment 2, a partial-converter ON signal GCON is output, and the converter element 41 is turned ON. As a result, the filter capacitor 5 is short-circuited though a route including the terminal 51, converter element 41, charging resistor 10, overvoltage suppression switch 15 and terminal 52.

According to Embodiment 2, the charging resistor 10 is used as the overvoltage suppression resistance, and in the same manner as in Embodiment 1, determination is made as to whether the overvoltage suppression circuit is operating. When determination is made that the overvoltage suppression circuit is not operating, processing is similar to that of Embodiment 1.

When determination is made that the overvoltage suppression circuit is not operating, the control unit 24 outputs the for-VCB-use OFF signal VCBOFF and opens the AC breaker 2, and outputs the for-AK-use ON signal AKON and closes the charging switch 9. Then the OVD-in-progress converter ON signal GCON_OV is output, and the converter element 41 and converter element 44 are turned ON, or alternatively, the converter element 42 and converter element 43 are turned ON. However, in the case of turning ON the converter element 42 and converter element 43, the converter element 41 is turned OFF.

Figure 5:
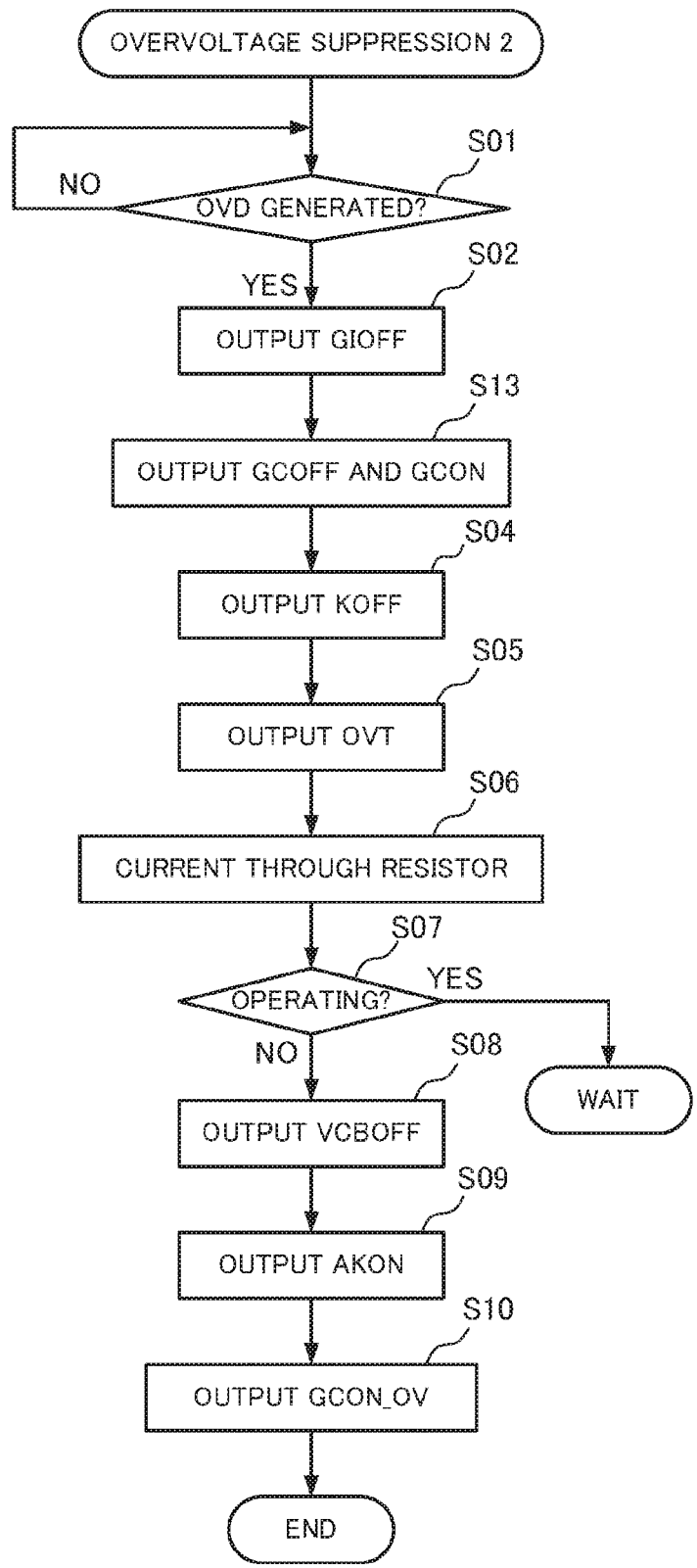
FIG. 5 is a flowchart showing one example of operation of overvoltage suppression according to Embodiment 2.

FIG. 5 is a flowchart showing one example of operation of overvoltage suppression according to Embodiment 2. In Embodiment 2, step S13 is executed in place of step S03, among the steps of the flowchart of FIG. 3. Otherwise, processing is similar to that of Embodiment 1.

According to Embodiment 2, when the overvoltage signal OVD is generated (YES in step S01), the inverter OFF signal GIOFF signal is output (step S02), and the converter OFF signal GCOFF and partial-converter ON signal GCON are output (step S13). Operation thereafter is similar to that of step S04 through step S10 of FIG. 3.

The embodiments are explained above by assuming cases in which electric power is received from the external circuit and the transformer 3 is used in the electric power transmission circuit for output of AC electric power. However, the electric power transmission circuit is not limited to the transformer, and in a case in which a breaker (AC breaker 2) for passing or blocking flow of current between the electric power transmission circuit and the external circuit is opened, DC current can be made to flow through an electric power transmission circuit between the terminals of the output side.

The foregoing describes some example embodiments for explanatory purposes. Although the foregoing discussion has presented specific embodiments, persons skilled in the art will recognize that changes may be made in form and detail without departing from the broader spirit and scope of the disclosure. Accordingly, the specification and drawings are to be regarded in an illustrative rather than a restrictive sense. This detailed description, therefore, is not to be taken in a limiting sense, and the scope of the disclosure is defined only by the included claims, along with the full range of equivalents to which such claims are entitled.

REFERENCE SIGNS LIST

1 Pantograph
2 AC breaker
3 Transformer
4 Converter
5 Filter capacitor
6 Inverter
7 Electric motor
8 AC switch (second contactor)
9 Charging switch (first contactor)
10 Charging resistor
11 Overvoltage suppression resistor
12 Overvoltage suppression switch
13 Overvoltage detector
14 Overvoltage suppression circuit
15 Overvoltage suppression switch
24 Control unit
31 Voltage determiner
32 Contactor ON-OFF determiner
33 Semiconductor element ON-OFF determiner
41, 42, 43, 44 Converter element
51, 52 Terminal
61, 62, 63, 64, 65, 66 Inverter element

The invention claimed is:
1. A power conversion device, comprising:
an electric power transmission circuit to receive electric power supplied from an external circuit and to output AC electric power;
a breaker to switch between passing and blocking of a current flow between the electric power transmission circuit and the external circuit;
a converter to convert AC electric power output from the electric power transmission circuit into DC electric power;
a capacitor to connect to the DC side of the converter;
a charging resistor and a first contactor to connect together in series between the electric power transmission circuit and the converter; and
a second contactor to bypass the charging resistor and the first contactor, and to switch between passing and blocking of current flow between the electric power transmission circuit and the converter, wherein the power conversion device operates on DC electric power output by the converter and to connect to a load circuit capable of generating regeneration electric power; and the power conversion device further comprises:

an overvoltage detector to detect when voltage across the capacitor is greater than or equal to a determined voltage;

an overvoltage suppression circuit to short-circuit the capacitor through a resistor when a voltage across the capacitor exceeds the predetermined value;

a detector to, when the voltage across the capacitor is greater than or equal to the determined voltage, detect that the overvoltage suppression circuit is not operating; and a control unit, when the voltage across the capacitor exceeds the predetermined value and the overvoltage suppression circuit does not operate, to perform steps comprising:

opening the breaker and the second contactor;

closing the first contactor; and turning on a converter element connected to a first terminal of the capacitor and to the charging resistor, and turning on a converter element connected to a second terminal of the capacitor and to a terminal not connected to the charging resistor of the electric power transmission circuit.

2. The power conversion device according to claim 1, wherein the overvoltage suppression circuit comprises a resistor and switch in series interconnecting both terminals of the capacitor.

3. The power conversion device according to claim 1, wherein the overvoltage suppression circuit comprises:

a first converter element to connect to the first terminal of the capacitor and to the charging resistor; and a charging resistor, and a switch to connect between the second terminal of the capacitor and a terminal of the charging resistor not connected to the first converter element.

* * * * *